2 Sheets—Sheet 1.

T. COCHEU.

STREET SIGN FOR LAMPS.

No. 11,092. Reissued July 1, 1890.

WITNESSES:

W. R. Davis.

C. Sedgwick

INVENTOR:

T. Cocheu

BY Munn & Co.

ATTORNEYS

THE NORRIS PETERS CO., PHOTO-LITHO., WASHINGTON, D. C.

T. COCHEU.

STREET SIGN FOR LAMPS.

No. 11,092. Reissued July 1, 1890.

WITNESSES:

W. R. Davis

C. Sedgwick

INVENTOR:

T. Cocheu

BY Munn & Co.

ATTORNEYS

THE NORRIS PETERS CO., PHOTO-LITHO., WASHINGTON, D. C.

UNITED STATES PATENT OFFICE.

THEODORE COCHEU, OF BROOKLYN, NEW YORK.

STREET-SIGN FOR LAMPS.

SPECIFICATION forming part of Reissued Letters Patent No. 11,092, dated July 1, 1890.

Original No. 420,675, dated February 4, 1890. Application for reissue filed March 22, 1890. Serial No. 344,860.

*To all whom it may concern:*

Be it known that I, THEODORE COCHEU, of Brooklyn, in the county of Kings and State of New York, have invented a new and Improved Street-Sign for Lamps, of which the following is a full, clear, and exact description.

My invention has for its object to provide simple, inexpensive, and efficient street-indicating signs for street-lamps, (electric lamps more particularly,) and which may be easily read from the street by daylight, or at night by the light of the lamp which supports them.

The invention consists in a street sign or indicator held to the lamp and bearing the names of the streets, and in arranging the sign-plates in peculiar positions relatively to the lamp body or frame and the plane of the light-arc or burner, all as hereinafter described and claimed.

Reference is to be had to the accompanying drawings, forming a part of this specification, in which similar letters of reference indicate corresponding parts in all the figures.

Figure 1:
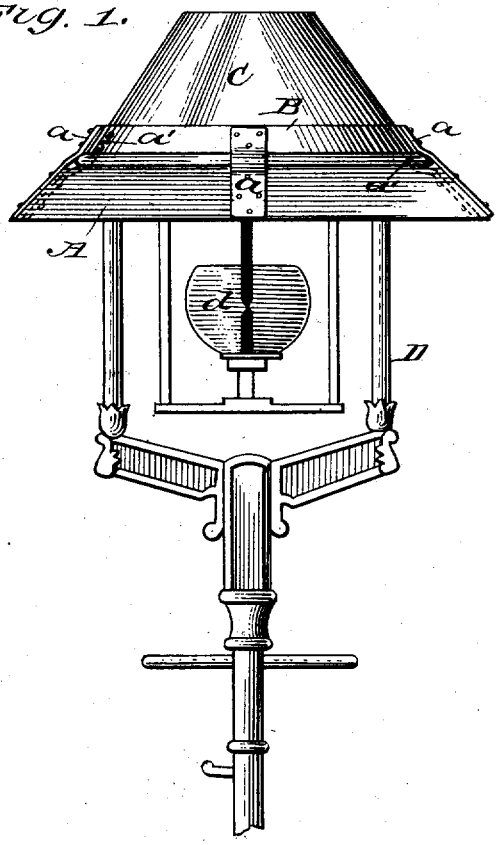
Figure 2:
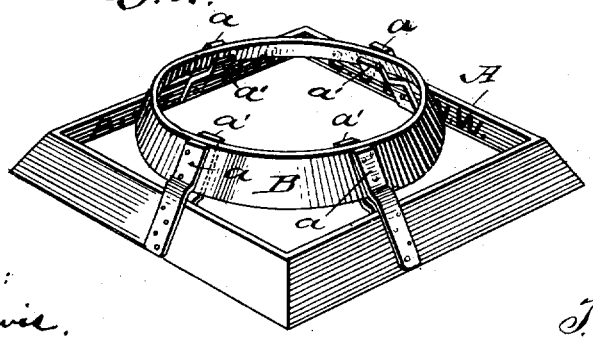
Figure 3:
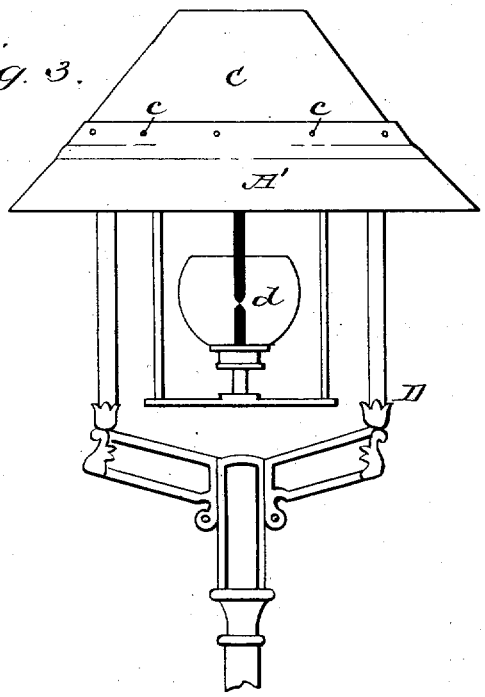
Figure 4:
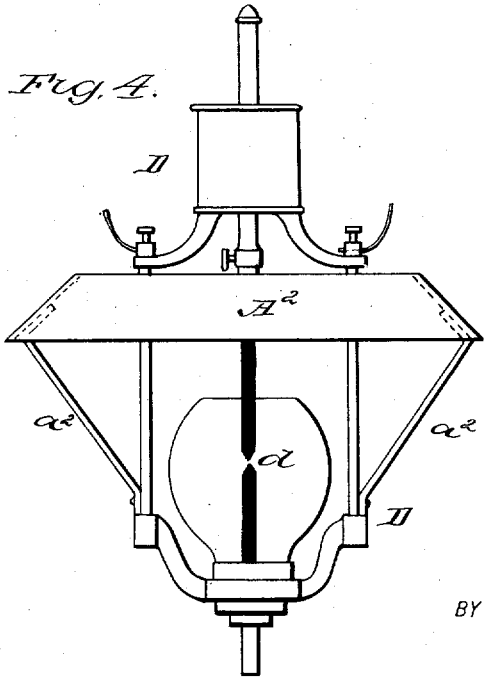

Figure 1 is a side elevation of an electric lamp with my improved street sign or indicator applied to it. Fig. 2 is a top perspective view of the sign removed from the lamp. Fig. 3 is a side elevation of the lamp provided with a modified form of street-sign, which is permanently riveted to the hood of the lamp; and Fig. 4 represents still another modification of the invention, wherein the street-sign is supported directly from the frame of an electric lamp instead of from its hood, as in other views.

It is a well-known practice to secure to ordinary street gas or oil lamps transparent signs which bear the names of streets in cities or towns, and this has been easily, cheaply, and effectively done by holding the signs to the interior or exterior of the glazed walls of the lamp, so that they are easily read from the street-level by daylight, and are made clearly visible at night by the light of the lamp or gas-jet burning at the center of the lamp case or body. Since the introduction of the electric light for street-illumination considerable difficulty has been met in providing the electric lamps with a simple and efficient system of street-signs which can be easily read from the street-level by daylight, and may be as easily if not more readily seen at night by the light of the lamp to which they are held.

My invention, while inexpensive and efficient, is very simple in its character, and, while it is defined more particularly in the claims hereinafter set forth, it may be considered broadly as the attachment to the lamp case or hood or frame of a plate or plates bearing the names of the streets, and whereby they will be readily visible by daylight and clearly seen at night by the light of the lamp itself.

The invention requires but a brief description with reference to the drawings, wherein Fig. 2 shows a preferred form of the street-lamp sign, which consists of a series of sign-plates A, preferably four in number, and connected at the ends to form a practically rectangular frame or structure, which has the names of two intersecting streets painted, printed, or otherwise produced on the lower face, and the plates are preferably disposed so that they stand at a downwardly and outwardly diverging angle, which is preferably about forty-five degrees from the perpendicular, in order that the names of the streets on the inner faces shall be more clearly visible to persons on the street by day or night. This sign-frame or plates A is shown connected by suitable clips or brackets *a* with a ring or frame B, which in the drawings is shown as a bevel ring or cone frustum adapted to rest upon or overlie the conical hood C of an electric lamp D at or near the lower edge or margin of the hood, so that the sign-frame projects downward and outward from the hood at an angle of about forty-five degrees and somewhat above the plane of the light-arc *d*, which throws its clear rays directly onto the sign-frame at all sides when the lamp is lighted or in circuit, thus allowing the names of the streets to easily be read by people passing directly under the lamp or at the other side of the street or road, it being remembered that lamps of this class are usually supported at considerable height above the level of the street. Inner clips *a'*, held to the sign-frame plates A, are bent upward at the inner face of the lamp-hood C after the sign is applied to it, and thereby lock the sign to the hood, so that it cannot be blown off by the wind.

In Fig. 3 of the drawings the street-sign plate A′ is represented as a downwardly-diverging ring or conic frustum, which is fitted directly to the lamp-hood C, and is secured thereto by rivets *c* as a permanent downward extension of the hood. The names of the streets will be printed or produced on the lower face of this sign-plate A′, to be clearly visible by day and receive the direct rays of the light-arc *d* by night.

In Fig. 4 of the drawings the sign-frame $A^2$ is shown as a rectangular structure whose walls diverge downward, and which is held by inclined rigid stays or braces $a^2$ to the frame-bars of the lamp, the effect as regards the visibility of the names of the streets by day or night being substantially the same as with the other forms of lamp or styles of signs, as will readily be understood.

It is manifest that my invention is not restricted to use with electric street-lamps, but is applicable as well to gas, oil, or other lamps.

Having thus described my invention, what I claim as new, and desire to secure by Letters Patent, is—

1. A street-sign for lamps, consisting of a frame having flaring sides and provided with the names of the streets on its surface and a beveled ring above the frame for supporting the frame from the top or hood of a lamp, substantially as herein shown and described.

2. The herein-described street-sign for lamps, consisting of the flaring frame A, having the names of the streets on its surface and provided with the brackets *a* and clips *a′*, and the beveled ring B, supported above the frame by brackets *a*, the said clips being adapted to be bent up under the hood of a lamp, as specified.

THEODORE COCHEU.

Witnesses:
HENRY B. COCHEU,
CATHERINE E. COCHEU.